(12) United States Patent
Honma

(10) Patent No.: US 12,437,682 B2
(45) Date of Patent: Oct. 7, 2025

(54) VEHICULAR DISPLAY DEVICE

(71) Applicant: Nippon Seiki Co., Ltd., Niigata (JP)

(72) Inventor: Hanako Honma, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 19/005,233

(22) Filed: Dec. 30, 2024

(65) Prior Publication Data

US 2025/0246101 A1 Jul. 31, 2025

(30) Foreign Application Priority Data

Jan. 31, 2024 (JP) ................................ 2024-012916

(51) Int. Cl.
| | |
|---|---|
| *G09G 3/00* | (2006.01) |
| *B60K 35/23* | (2024.01) |
| *B60K 35/234* | (2024.01) |
| *G02B 27/01* | (2006.01) |
| *B60K 35/60* | (2024.01) |

(52) U.S. Cl.
CPC .......... *G09G 3/001* (2013.01); *B60K 35/234* (2024.01); *G02B 27/0101* (2013.01); *B60K 35/23* (2024.01); *B60K 35/60* (2024.01); *B60K 2360/23* (2024.01); *B60K 2360/349* (2024.01); *B60R 2300/205* (2013.01); *G02B 27/01* (2013.01); *G02B 2027/0118* (2013.01); *G02B 2027/014* (2013.01); *G09G 2320/0626* (2013.01); *G09G 2380/10* (2013.01)

(58) Field of Classification Search
CPC .......... G09G 3/001; G09G 2320/0626; G09G 2380/10; B60K 35/234; B60K 2360/23; B60K 2360/349; B60K 35/23; B60K 35/60; G02B 27/0101; G02B 2027/0118; G02B 2027/014; G02B 27/01; B60R 2300/205
See application file for complete search history.

(56) References Cited

U.S. PATENT DOCUMENTS

| | | | |
|---|---|---|---|
| 9,551,869 B2 * | 1/2017 | Masuda | G06F 3/1423 |
| 10,250,860 B2 | 4/2019 | Kurosawa | |
| 11,011,137 B2 * | 5/2021 | Higashiyama | H04N 9/3182 |
| 2024/0210684 A1 * | 6/2024 | Kitahara | G02B 27/0101 |
| 2025/0189785 A1 * | 6/2025 | Yamamoto | B60K 35/00 |

FOREIGN PATENT DOCUMENTS

JP 6516642 B2 5/2019

* cited by examiner

*Primary Examiner* — Douglas Wilson
(74) *Attorney, Agent, or Firm* — Rimon P.C.

(57) ABSTRACT

A vehicle display device, which emits display light from an opening toward a windshield and thereby allows a virtual image and a real image of a display image represented by the display light to be visually recognized, includes a display unit including a display element, transmitting light emitted by a light source, and displaying the display image, a reflection unit reflecting light representing the display image displayed on the display unit toward the windshield, and a control unit. The control unit executes light intensity control processing of controlling a light intensity of the light source in such a way that a real image display luminance setting when a real image is visually recognized and a virtual image display luminance setting when a virtual image is visually recognized have a predetermined luminance difference from each other.

8 Claims, 12 Drawing Sheets

|  | VIRTUAL IMAGE VI | REAL IMAGE RI |
|---|---|---|
| AMBIENT LIGHT | BRIGHT | BRIGHT |
| LUMINANCE SETTING | HIGH | LOW |

| | VIRTUAL IMAGE VI | REAL IMAGE RI |
|---|---|---|
| AMBIENT LIGHT | DARK | BRIGHT |
| LUMINANCE SETTING | LOW | HIGH |

(A)

(B)

VEHICULAR DISPLAY DEVICE

CROSS-REFERENCE TO RELATED APPLICATIONS

This application claims the benefit of foreign priority to Japanese Patent Application No. 2024-012916 filed on Jan. 31, 2024, the entire contents of each of which are hereby incorporated by reference.

TECHNICAL FIELD

The present invention relates to a vehicle display device which performs desired display to a viewer.

BACKGROUND ART

Conventionally, for example, an electronic device described in Patent Document is known. The electronic device includes a cluster display unit attached to an instrument panel and an HUD, determines a traveling state of a vehicle, and based on the determination result, adjusts a focal length of the HUD in such a way that a position of a virtual image of a projection image is near the cluster display unit or in front of a front windshield.

PRIOR ART DOCUMENT

Patent Document

Patent Document 1: Japanese Patent No. 6516642

SUMMARY OF INVENTION

Technical Problem

However, in the above-described conventional electronic device, since the display position of the virtual image is switched between inside of the vehicle and outside of the vehicle, the display outside the vehicle and the display inside the vehicle, which are viewed together with an environmental light, are viewed differently. Therefore, there has been a problem in that when switching the display position from one display to an other display and visually recognizing the display (or when visually recognizing the display at the same time), the display may be dazzling due to a difference in luminance.

Therefore, the present invention has been conceived in view of the above-described problem, and an object of the present invention is to provide a vehicle display device that improves visibility of a viewer by adjusting light intensity in each display when the display is performed by switching between the inside and the outside of the vehicle.

Solution to Problem

According to an aspect of the present invention, a vehicle display device 1 is provided in a vehicle C including a seat on which an occupant DR sits and a translucent member WS, and emits display lights L1 and L2 from an emission port 17 toward the translucent member WS and thereby allows a virtual image VI and a real image RI of a display image represented by the display lights L1 and L2 to be visually recognized, the vehicle display device 1 including a display unit 12 that includes a display element, the display unit 12 transmitting light emitted by a light source 11 and displaying the display image, a reflection unit 13 that reflects light representing the display image displayed on the display unit 12 toward the translucent member WS, and a control unit 15, in which the control unit 15 executes light intensity control processing (S3, S4, S6, and S7) of controlling a light intensity of the light source 11 in such a way that a first display luminance setting when the real image RI is visually recognized and a second display luminance setting when the virtual image VI is visually recognized have a predetermined luminance difference from each other.

Advantageous Effects of Invention

According to an aspect of the present invention, it is possible to allow the occupant of the vehicle to visually recognize the real image and the virtual image with an appropriate luminance difference by adjusting the light intensity of the light source.

DESCRIPTION OF EMBODIMENTS

First Embodiment

Figure 1:
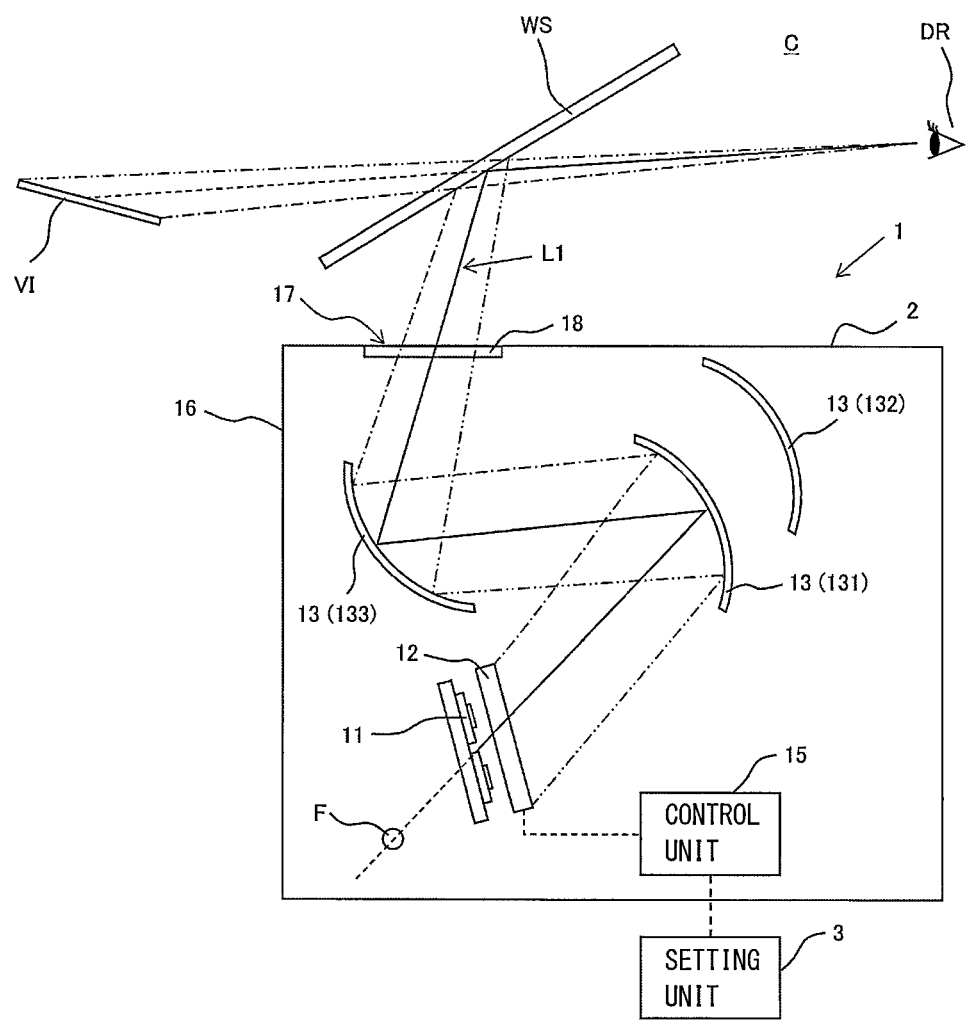
FIG. 1 is a diagram illustrating a configuration in a case where a virtual image is generated in a vehicle display device according to a first embodiment of the present invention.

A vehicle display device according to the present embodiment will be described with reference to FIGS. 1 to 11. FIG. 1 is a diagram illustrating a configuration in a case where a virtual image is generated in the vehicle display device according to the present embodiment, and FIG. 2 is a diagram illustrating a configuration in a case where a real image is generated in the vehicle display device according to the present embodiment.

Figure 2:
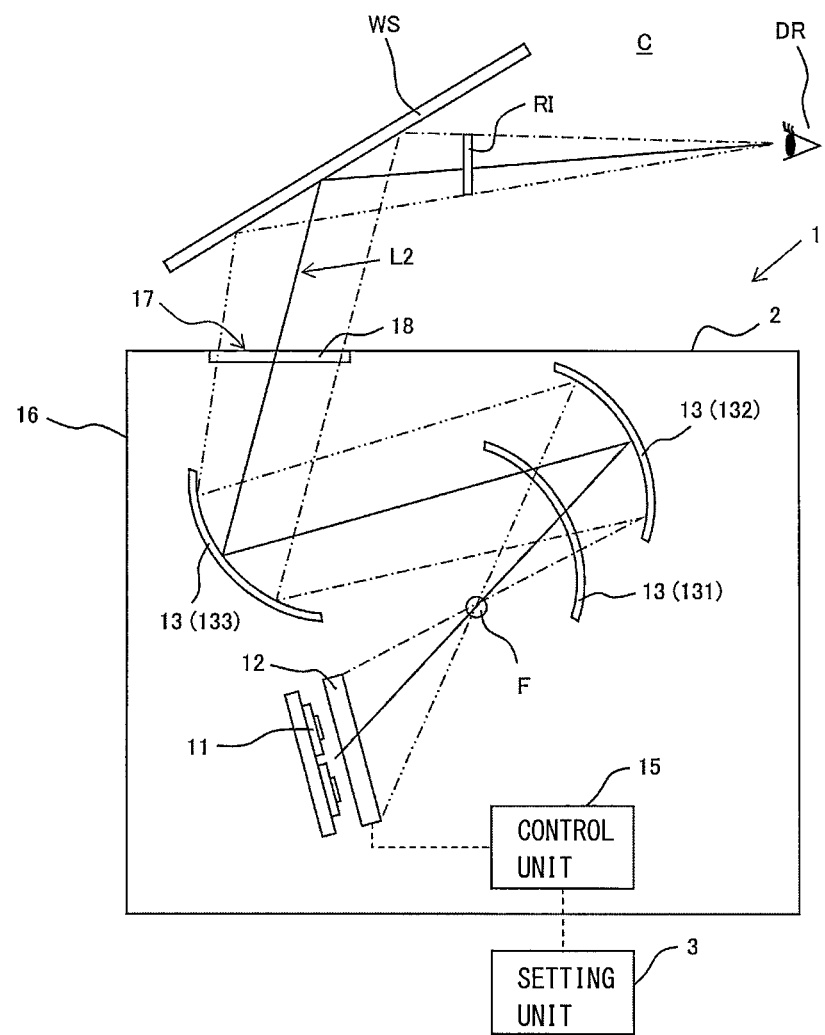
FIG. 2 is a diagram illustrating a configuration in a case where a real image is generated in the vehicle display device according to the first embodiment of the present invention.

In FIGS. 1 and 2, a vehicle display device 1 includes a head-up display device (hereinafter, referred to as an HUD device) 2 and a setting unit 3 that stores setting information used for controlling the HUD device 2. The HUD device 2 is composed of, for example, a light-emitting diode that is mounted on an interconnection substrate and emits light in a visible wavelength range, and includes a light source 11 that emits white light, a display unit 12 that generates an image with light incident from the light source 11 and displays the image by switching a polarized light of emitted light between first polarized light and second polarized light which are different from each other, a reflection unit 13 that reflects a display light L representing a display image displayed on the display unit 12 (in a case of FIG. 1, a display light L1 representing a display image of a virtual image VI, in a case of FIG. 2, a display light L2 representing a display image of a real image RI) toward a windshield WS (translucent member), and a control unit 15 that performs control of display contents in the display unit 12 and control of switching between the first polarized light and the second polarized light, and control of luminance by adjusting light intensity of light emitted from the light source 11. These are accommodated in a housing 16. An opening 17 (emission port) from which the display light L is emitted is provided in the housing 16, and a cover glass 18 for protecting the inside is disposed in the opening 17. The windshield WS is an example of a light projecting member, and the opening 17 is an example of the emission port.

The HUD device 2 is disposed below a windshield WS (for example, inside an instrument panel) of a vehicle C, emits the display light L (L1, L2), and projects the display light L onto the windshield WS. The display light L is generated by the light source 11 and the display unit 12 inside the HUD device 2. The display light L emitted from the display unit 12 travels along the reflection unit 13 and is emitted from the opening 17 of the housing 16 through the cover glass 18. A driver DR (occupant) of the vehicle C visually recognizes display light L reflected by the windshield WS, thereby enabling to visually recognize a virtual image VI as illustrated in FIG. 1 on the back side of the windshield WS and a real image RI as illustrated in FIG. 2 on the near side thereof.

In the virtual image VI illustrated in FIG. 1, there are displayed on the opposite side of the windshield WS when viewed from the driver DR, information that is highly necessary to call attention of the driver DR, for example, vehicle information such as a speed and an engine speed of the vehicle C, route guidance display such as turn-by-turn and a map, a blind spot indicator, warning display such as a speed limit excess warning, and the like. In addition, in the real image RI illustrated in FIG. 2, for example, entertainment content, an assistant or an agent that supports the driver DR, a character indicating the assistant or the agent, or the like is displayed on the near side of the windshield WS when viewed from the driver DR. These displays provide a driving environment with reduced need for viewpoint movement and eye focal length adjustment. The virtual image VI and the real image RI include characters and icons indicating the information, as well as a background portion, which has, for example, a substantially rectangular shape in a plan view from the driver DR.

Figure 3:
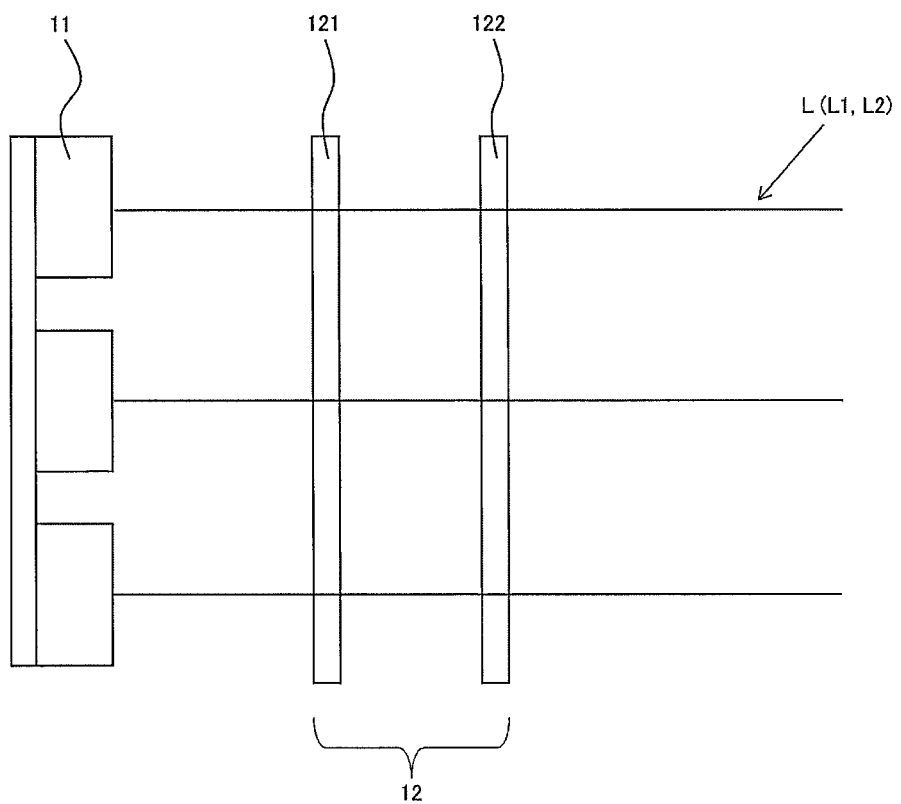
FIG. 3 is a schematic diagram illustrating a structure of a light source and a display unit of an HUD device in the vehicle display device according to the first embodiment of the present invention.

Herein, configurations of the light source 11 and the display unit 12 will be described. FIG. 3 is a schematic diagram illustrating a structure of the light source 11 and the display unit 12 of the HUD device 2 in the vehicle display device 1 according to the present embodiment. As illustrated in FIG. 3, the display unit 12 is provided closer to the emission port along an optical path than the light source 11. The display unit 12 includes, for example, a thin film transistor (TFT) type display element 121, and a switching element 122 which is provided closer to the emission port along the optical path than the display element 121 and switches the polarized light of the display light L to be emitted between first polarized light and second polarized light that are different from each other.

For example, the first polarized light may be S-polarized light, and the second polarized light may be P-polarized light, or vice versa. In addition, not limited to the S-polarized light and the P-polarized light, polarization angles of the first polarized light and the second polarized light may be different from each other, and for example, the polarization angles are desirably different from each other by at least 22.5 degrees or more.

In addition, as illustrated in FIGS. 1 and 2, it is desirable that the display unit 12 is disposed to be inclined with respect to an axial direction of a light beam of the display light L in order to exclude stray light (light leaking from the light source 11) or external light (light entering from the outside) from an optical path of the display light L.

The light source 11 is connected to a real image luminance adjustment unit 54a and a virtual image luminance adjustment unit 54b, which will be described below in FIG. 4, and light intensities thereof are adjusted in such a way that a real image display luminance setting value (first display luminance setting) when causing the driver DR to visually recognize the real image RI and a virtual image display luminance setting value (second display luminance setting) when causing the driver DR to visually recognize the virtual image VI have a predetermined luminance difference from each other. The display element 121 forms light representing a figure of an arbitrary shape in accordance with a signal sent from the control unit 15. In addition, the switching element 122 extracts a only specific polarized light, specifically, light beams that are the first polarized light or the second polarized light described above, from among light beams emitted from the display element 121, and performs a process of switching the polarized lights. The switching element 122 is connected to a switching control unit 22, which will be described below with reference to FIG. 4, and switches the polarized light in accordance with a signal sent from the switching control unit 22.

The switching of the polarized light using the switching element 122 may be performed by electrical processing, or the polarized light may be switched by disposing a polarization plate or a wavelength plate on the emission port side of the display element 121 and physically rotating the polarization plate or the wavelength plate at a predetermined angle with respect to a central axis with an optical axis direction set as a central axis direction. In either case, the polarized light is switched under the control of the switching control unit 22.

In FIGS. 1 and 2, the reflection unit 13 includes a first mirror 131, a second mirror 132, and a third mirror 133 which are mirrors each having a concave shape. The first mirror 131 reflects the display light L1 (first light beam) as the first polarized light and transmits the display light L2 (second light beam) as the second polarized light. The second mirror 132 reflects the display light L2 (second light beam) transmitted through the first mirror 131. The display light L1 reflected by the first mirror 131 and the display light L2 reflected by the second mirror 132 are guided to the third mirror 133, reflected by the third mirror 133, and emitted to the windshield WS, and therefore, the driver DR can visually recognize each display image. The display light L1 is an example of the first light beam, and the display light L2 is an example of the second light beam.

Figure 12:
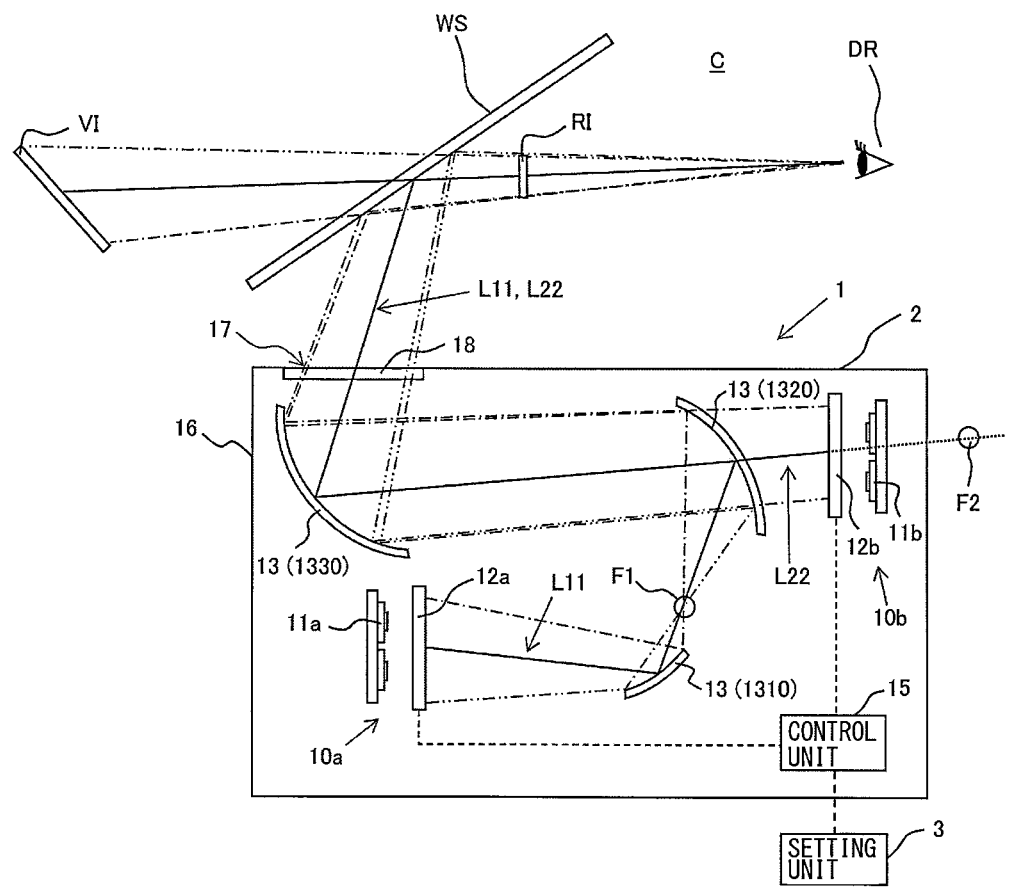
FIG. 12 is a diagram illustrating a configuration of a vehicle display device according to a second embodiment of the present invention.

Although an infinite number of light beams are originally emitted from the display unit 12, light emitted from the center of the display unit 12 and passing through the center of an eye box is referred to as a representative light beam and is denoted by a symbol L in order to simplify the description. In FIGS. 1 and 2, and FIG. 12 to be described below, a representative light beam emitted from the center of the display unit 12 is indicated by a solid line, a light beam emitted from an upper end portion of the display unit 12 is indicated by a dot chain line, and a light beam emitted from a lower end portion of the display unit 12 is indicated by a two-dot chain line.

In addition, as illustrated in FIG. 2, since the first mirror 131 is a mirror that transmits the display light L2, the display light L2 reflected by the second mirror 132 can naturally be transmitted from the back surface side where the second mirror 132 is located to the front surface side. Accordingly, as illustrated in FIG. 2, the display light L2 transmitted through the first mirror 131 is reflected by the second mirror 132, is transmitted through the first mirror 131 again, and is guided to the third mirror 133. Thus, the second mirror 132 can be disposed close to the back surface side of the first mirror 131, and the housing 16 can be prevented from being increased in size.

Herein, for example, the first polarized light is S-polarized light (S-polarized light with respect to the first mirror 131), the second polarized light is P-polarized light (P-polarized light with respect to the first mirror 131), the first mirror 131 is a mirror that reflects a light beam of the S-polarized light with respect to the first mirror 131 and transmits a light beam of the P-polarized light, and the second mirror 132 is a mirror that reflects a light beam of the P-polarized light with respect to the first mirror 131 and transmits a light beam of the S-polarized light. In a case of such a configuration, the display light L1 which is the S-polarized light is reflected by the first mirror 131 and is guided to the third mirror 133. The display light L2, which is a P-polarized light, passes through the first mirror 131, is reflected by the second mirror 132, and is guided to the third mirror 133. By setting the configuration of the reflection unit 13 and the polarized lights of the display lights L1 and L2, it is possible to generate display images in which the display lights L1 and L2 are different from each other.

The display image represented by the display light L1 in FIG. 1 and the display image represented by the display light L2 in FIG. 2 will be specifically described. As illustrated in FIG. 2, the second mirror 132 is a mirror having a concave shape, and has a radius of curvature R2 such that, when the second mirror 132, the third mirror 133, and the windshield WS are regarded as one optical system, a second state where the display unit 12 is positioned outside a focal length of the optical system (on a front stage side with respect to the display light L) is established. Thus, when the light of the second polarized light is emitted, the light reflected by the second mirror 132, the third mirror 133, and the windshield WS is visually recognized by the driver DR as the real image RI.

Further, as illustrated in FIG. 1, the first mirror 131 is also a mirror having a concave shape, but has a radius of curvature R1 larger than the radius of curvature R2 of the second mirror 132 (R1>R2), and the radius of curvature is such that when the first mirror 131, the third mirror 133, and the windshield WS are regarded as one optical system, a first state where the display unit 12 is positioned inside a focal length of the optical system (on a rear stage side with respect to the display light L) is established. This is because when the radius of curvature of the mirror having a concave shape is large, the focal length becomes farther from the mirror, and when the radius of curvature is small, the focal length becomes closer to the mirror, and thus the first mirror 131 having a far focal length has a larger radius of curvature. Thus, when the light of the first polarized light is emitted, the light reflected by the first mirror 131, the third mirror 133, and the windshield WS is visually recognized by the driver DR as the virtual image VI. In FIGS. 1 and 2, an optical focal point is indicated by F.

Namely, for example, when the virtual image VI is intended to be visually recognized behind the windshield WS as viewed from the driver DR, the switching element 122 of the display unit 12 switches the display light L to be emitted as the display light L1, which is the first polarized light, and the display image represented by the display light L1 is displayed on the windshield WS by an imaging optical system including the first mirror 131, the third mirror 133, and the windshield WS. For example, when the real image RI is intended to be visually recognized on the near side of the windshield WS viewed from the driver DR, the switching element 122 of the display unit 12 switches the display light L to be emitted as the display light L2, which is the second polarized light, and the display image represented by the display light L2 is displayed on the windshield WS by an imaging optical system including the second mirror 132, the third mirror 133, and the windshield WS.

In FIGS. 1 and 2, the first mirror 131 is described as a mirror having a concave shape, but when the first mirror 131, the third mirror 133, and the windshield WS are regarded as one optical system, a mirror having a planar shape or a mirror having a convex shape may be used as long as a condition that the position of the display unit 12 is inside the focal length of the optical system (on the rear stage side with respect to the display light L) is satisfied.

In addition, in FIGS. 1 and 2, the third mirror 133 is described as a mirror having a concave shape, but may be a mirror having a planar shape or a mirror having a convex shape, and may have a shape having no magnification since the display lights L1 and L2 are irradiated via the same third mirror 133 in both a case of displaying the virtual image VI and a case of displaying the real image RI.

The control unit 15 performs at least control of display content in the display unit 12, control of switching between the first polarized light and the second polarized light, and control of luminance by adjusting the light intensity emitted by the light source 11. FIG. 4 is a functional block diagram for describing a configuration of the control unit 15 of the vehicle display device 1 according to the present embodiment. In FIG. 4, only the configuration directly related to processing of the control unit 15 is described, and descriptions of other known configurations are omitted.

Figure 4:
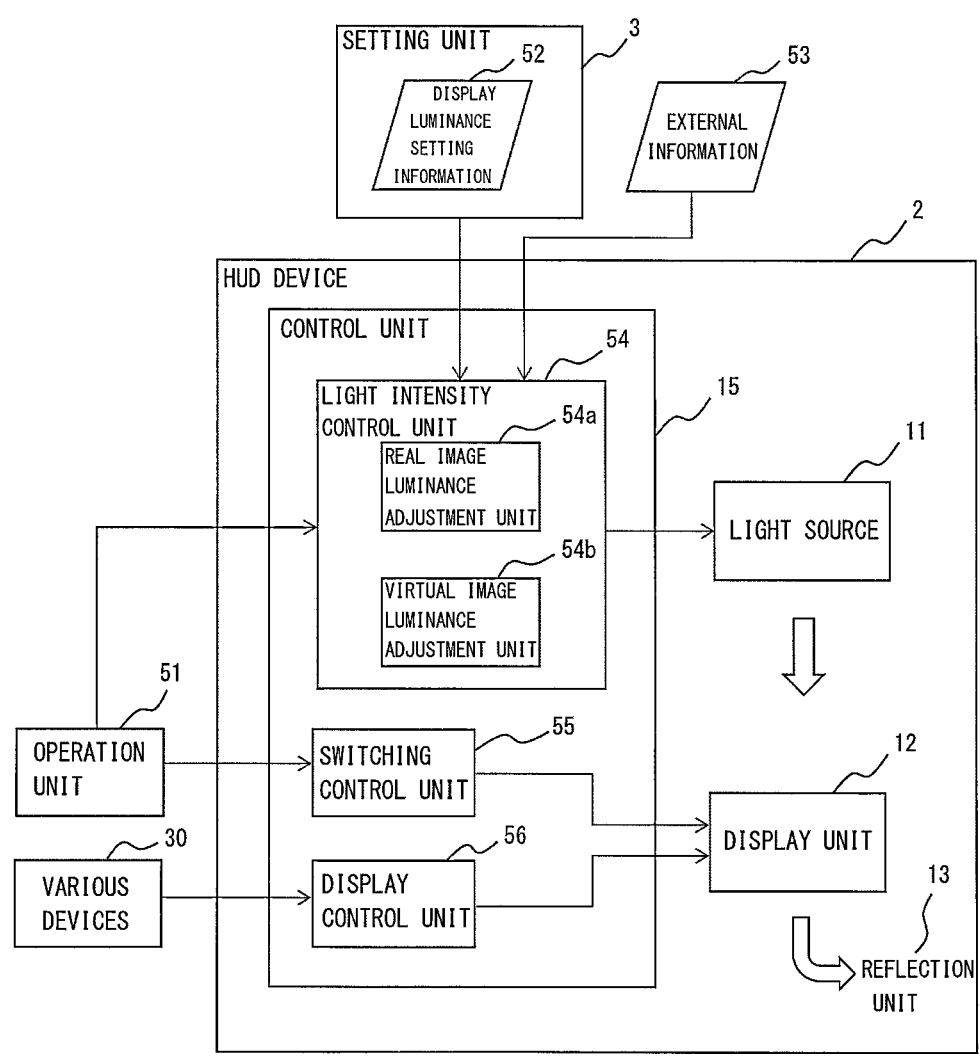
FIG. 4 is a functional block diagram for describing a configuration of a control unit of the vehicle display device according to the first embodiment of the present invention.

In FIG. 4, the HUD device 2 includes the control unit 15, the light source 11, the display unit 12, and the reflection unit 13 which are described above. The control unit 15 includes a light intensity control unit 54 that controls the light intensity of the light source 11, based on operation information from an operation unit 51 that switches a driving mode (e.g., an automatic driving mode/a manual driving mode) of the vehicle C, display luminance setting information 52 regarding the luminance of the virtual image VI and the real image RI set in advance in the setting unit 3, and external information 53 indicating a surrounding environment of the vehicle C. In addition, the control unit 15 includes a switching control unit 55 that switches the display light L emitted by the display unit 12 to the first polarized light or the second polarized light (i.e., switches the display state of the virtual image VI and the display state of the real image RI), based on the operation information from the operation unit 51. Further, the control unit 15 includes a display control unit 56 that instructs the display unit 12 to generate light representing a figure having an arbitrary shape, based on information sent from various devices 30 such as a vehicle speed sensor, a navigation apparatus, a radio detecting and ranging (RADAR), and a light detection and ranging (Laser Imaging Detection and Ranging) (LiDAR). Further, the control unit 15 includes a display control unit 56 that instructs the display unit 12 to generate light representing a figure having an arbitrary shape, based on information sent from various devices 30 such as a vehicle speed sensor, a navigation apparatus, a Radio Detecting and Ranging (RADAR), and a Light Detection and Ranging (Laser Imaging Detection and ranging) (LiDAR).

The driving mode of the vehicle C includes an automatic driving mode and a manual driving mode. For example, in the automatic driving mode, the real image RI is displayed on the near side of the windshield WS (inside the vehicle) as viewed from the driver DR, and in the manual driving mode, the virtual image VI is displayed on the far side of the windshield WS (outside the vehicle) as viewed from the driver DR. Namely, when the driving mode by the operation unit 51 is switched from the automatic driving mode to the manual driving mode, the switching control unit 55 switches the display light L emitted by the display unit 12 from the light beam of the second polarized light to the light beam of the first polarized light. Conversely, when the driving mode by the operation unit 51 is switched from the manual driving mode to the automatic driving mode, the switching control unit 55 switches the display light L emitted by the display unit 12 from the light beam of the first polarized light to the light beam of the second polarized light.

In addition to the switching of the driving mode, for example, the polarization state of the display light L may be switched according to ON/OFF of an adaptive cruise control (ACC). When the ACC function is ON, the switching control unit 55 may switch the display light L emitted by the display unit 12 from the light beam of the first polarized light to the light beam of the second polarized light, and when the ACC function is OFF, the switching control unit 55 may switch the display light L from the light beam of the second polarized light to the light beam of the first polarized light.

In the switching process of the switching control unit 55, the display of the virtual image VI viewed together with light of the surrounding environment of the vehicle C (hereinafter, referred to as environmental light) and the display of the real image RI viewed inside the vehicle are different in appearance. In a case where the position of the display image to be visually recognized is switched between the virtual image VI display and the real image RI display, when both are displayed with the same luminance, the driver DR may feel a difference in luminance due to the difference between the environmental light and the vehicle interior light, and the driver DR may feel that the display image is dazzling. This is particularly noticeable when a display image and a scene in the peripheral visual field of the display image are visually recognized at the same time. Therefore, the light intensity control unit 54 solves the problem by adjusting the luminance of the virtual image VI and the real image RI.

Figure 5:
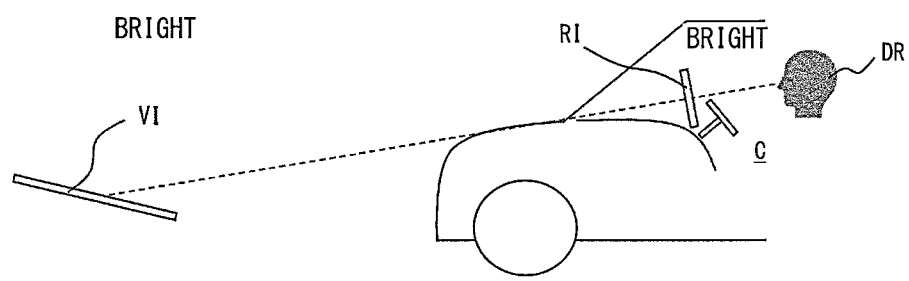
FIG. 5 is a diagram illustrating setting of luminance with respect to environmental light in daytime.
Figure 6:
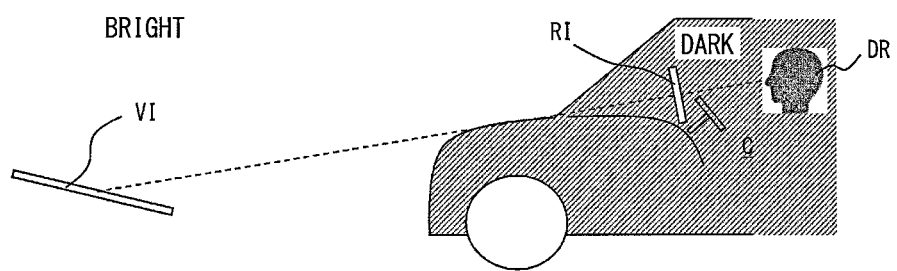
FIG. 6 is a diagram illustrating setting of luminance with respect to environmental light in evening.
Figure 7:
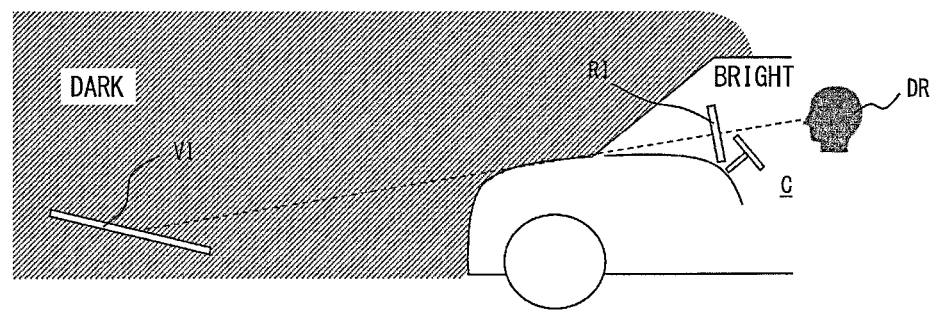
FIG. 7 is a diagram illustrating setting of luminance with respect to environmental light at night.

Hereinafter, a setting of luminance according to environmental light will be specifically described. FIG. 5 is a diagram illustrating a setting of luminance with respect to daytime environmental light, FIG. 6 is a diagram illustrating a setting of luminance with respect to evening environmental light, and FIG. 7 is a diagram illustrating a setting of luminance with respect to nighttime environmental light. In the daytime, as illustrated in FIG. 5, environmental light outside a vehicle is bright and the inside of the vehicle is equal to or slightly darker than the environmental light. At this time, when the virtual image VI and the real image RI are displayed with the same luminance, the driver DR feels that the real image RI is dazzling. Therefore, the luminance of the virtual image VI viewed together with the environmental light outside the vehicle is set to be high, and the luminance of the real image RI viewed inside the vehicle is set to be low.

In the evening, as illustrated in FIG. 6, environmental light outside a vehicle is still bright and the inside of the vehicle is still dark. At this time, when the virtual image V and the real image RI are displayed with the same luminance, the driver DR feels that the real image RI is dazzling as in the case of FIG. 5. Therefore, the luminance of the virtual image VI viewed together with the environmental light outside the vehicle is set to be high, and the luminance of the real image RI viewed inside the vehicle is set to be low.

At night, as illustrated in FIG. 7, environmental light outside the vehicle is dark and the inside of the vehicle is bright due to the vehicle interior light. At this time, when the virtual image VI and the real image RI are displayed with the same luminance, the driver DR feels that the virtual image VI is dazzling. Therefore, the luminance of the virtual image VI viewed together with the environmental light outside the vehicle is set to be low, and the luminance of the real image RI viewed inside the vehicle is set to be high.

In short, an appropriate luminance is set for each scene, depending on the environmental light outside and inside the vehicle. The setting of the environmental light outside and inside the vehicle may be manually input by the driver DR, may be set based on information on turning on/off of headlights of the vehicle C, or may be set based on illuminance information of external light detected by an illuminance sensor provided in the vehicle C, for example. Specifically, for example, when the headlights are not turned on, it is regarded as daytime or evening, and the setting in the daytime or evening state is applied. When the headlights are turned on, it is regarded as nighttime, and the setting in the nighttime state is applied. Further, when the illuminance sensor provided in the vehicle C detects brightness equal to or higher than predetermined illuminance, it is regarded as daytime or evening, and the setting in the daytime or evening state is applied. When brightness less than the predetermined illuminance is detected, it is regarded as nighttime, and the setting in the nighttime state is applied.

The setting information on luminance according to the environmental light outside and inside the vehicle is registered in advance in the display luminance setting information 52 illustrated in FIG. 4. Specifically, as illustrated in FIGS. 5 to 7, a real image display luminance setting value (first display luminance setting) when the real image RI is visually recognized and a virtual image display luminance setting value (second display luminance setting) when the virtual image VI is visually recognized are registered in the display luminance setting information 52 for each state of the environmental light outside and inside the vehicle. The real image luminance adjustment unit 54a illustrated in FIG. 4 performs a process of adjusting the light intensity of the light source 11 in such a way that the luminance of the real image RI becomes a real image display luminance setting value when the real image RI is displayed, and the virtual image luminance adjustment unit 54b performs a process of adjusting the light intensity of the light source 11 in such a way that the luminance of the virtual image VI becomes a virtual image display luminance setting value when the virtual image VI is displayed. As a result, the real image RI and the virtual image VI have a predetermined luminance difference between the images.

For example, in the case of the daytime in FIG. 5 and in the case of the evening in FIG. 6, the virtual image display luminance setting value, which is a setting value of the virtual image VI viewed together with the environmental light outside the vehicle, is set to be high, and the real image display luminance setting value, which is a setting value of the real image RI viewed inside the vehicle, is set to be low. In this state, when the driving mode of the vehicle C is switched from the manual driving mode to the automatic driving mode and the display of the virtual image VI outside the vehicle is accordingly switched to the display of the real image RI inside the vehicle, the real image luminance adjustment unit 54a of the light intensity control unit 54 adjusts the luminance of the real image RI to be low (e.g., about 500 cd/m$^2$) in accordance with the real image display luminance setting value. Conversely, when the driving mode of the vehicle C is switched from the automatic driving mode to the manual driving mode and the display of the real image RI inside the vehicle is accordingly switched to the display of the virtual image VI outside the vehicle, the virtual image luminance adjustment unit 54b of the light intensity control unit 54 adjusts the luminance of the virtual image VI to be high (e.g., about 1000 cd/m$^2$) in accordance with the virtual image display luminance setting value. As for a high (low) degree of luminance referred to herein, in a relationship between the luminance of the virtual image VI and the luminance of the real image RI, a relatively high (bright) luminance is referred to as a high luminance, and a relatively low (dark) luminance is referred to as a low luminance.

Further, for example, in the case of the nighttime in FIG. 7, the virtual image display luminance setting value, which is a setting value of the virtual image VI viewed together with the environmental light outside the vehicle, is set to be low, and the real image display luminance setting value, which is a setting value of the real image RI viewed inside the vehicle, is set to be high. In this state, when the driving mode of the vehicle C is switched from the manual driving mode to the automatic driving mode and the display of the virtual image VI outside the vehicle is accordingly switched to the display of the real image RI inside the vehicle, the real image luminance adjustment unit 54a of the light intensity control unit 54 adjusts the luminance of the real image RI to be high (e.g., about 1000 cd/m$^2$) in accordance with the real image display luminance setting value. Conversely, when the driving mode of the vehicle C is switched from the automatic driving mode to the manual driving mode and the display of the real image RI inside the vehicle is accordingly switched to the display of the virtual image VI outside the vehicle, the virtual image luminance adjustment unit 54b of the light intensity control unit 54 adjusts the luminance of the virtual image VI to be low (e.g., about 500 cd/m$^2$) in accordance with the virtual image display luminance setting value.

Figure 8A:
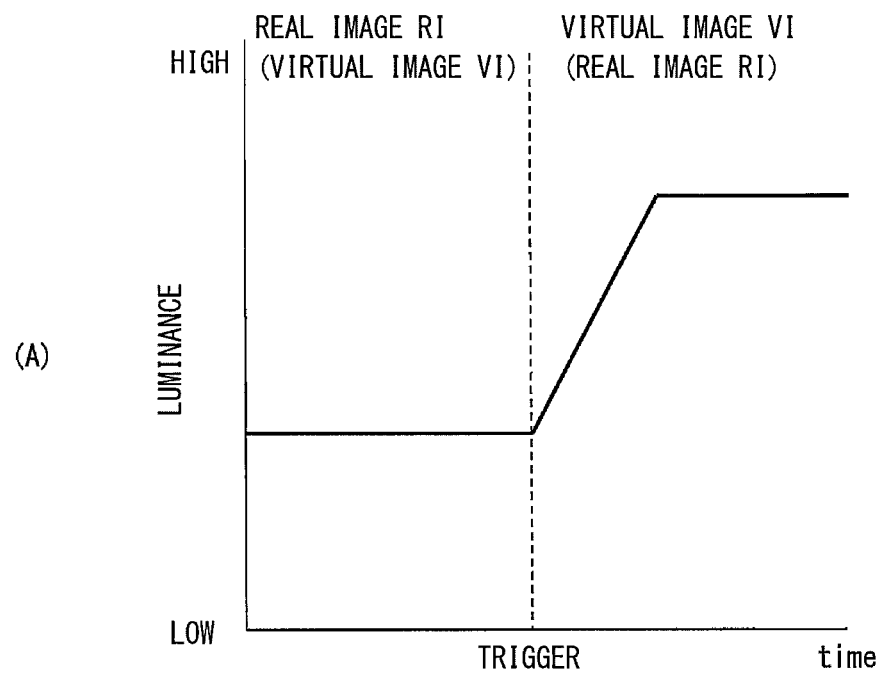
FIGS. 8A and 8B are diagrams each illustrating an example of a change in luminance in a case of switching between real image display and virtual image display in the vehicle display device according to the first embodiment of the present invention.
Figure 8B:
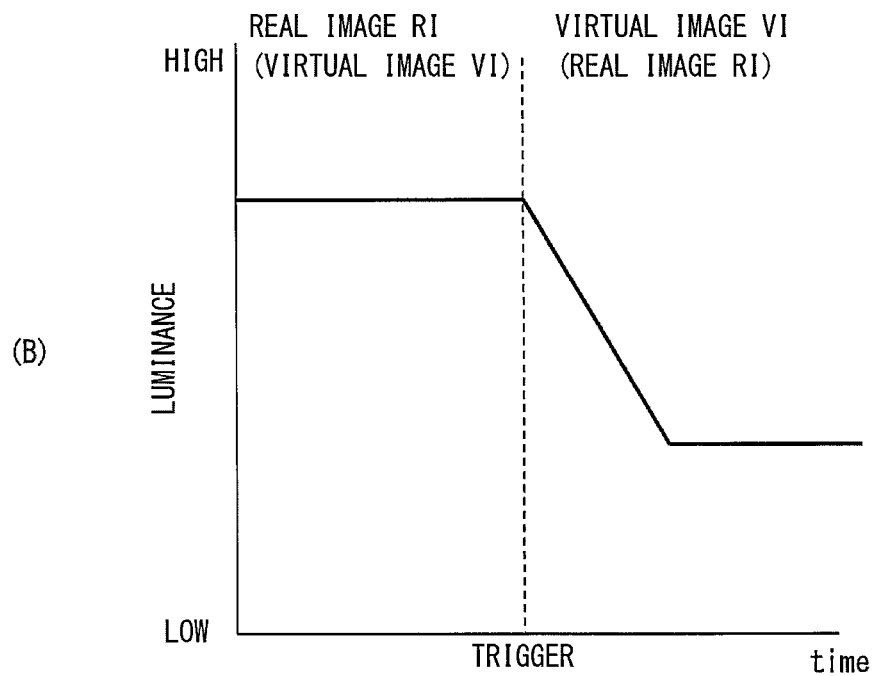

FIGS. 8A and 8B are diagrams each illustrating an example of a change in luminance in a case where the real image RI display and the virtual image VI display are switched in the vehicle display device 1 according to the present embodiment. FIG. 8A illustrates an example of a change in luminance in a case where a display state where luminance is set to be low is switched to a display state where luminance is set to be high, and FIG. 8B illustrates an example of a change in luminance in a case where a display state where luminance is set to be high is switched to a display state where luminance is set to be low. Each trigger in FIGS. 8A and 8B is, for example, a switching operation of the driving mode or ON/OFF switching information of the ACC.

In the case of the daytime or the evening in FIGS. 5 and 6 described above, when the display is switched from the virtual image VI display to the real image RI display, the setting of the luminance is changed from a high state to a low state, and thus the luminance changes as illustrated in parentheses in FIG. 8B. On the contrary, when the display is switched from the real image RI display to the virtual image VI display, the setting of the luminance is changed from a low state to a high state, and thus the luminance changes as illustrated in FIG. 8A.

In the case of the nighttime in FIG. 7 described above, when the display is switched from the virtual image VI display to the real image RI display, the setting of the luminance is changed from a low state to a high state, and thus the luminance changes as illustrated in parentheses in FIG. 8A. On the contrary, when the display is switched from the real image RI display to the virtual image VI display, the setting of the luminance is changed from a high state to a low state, and thus the luminance changes as illustrated in FIG. 8B.

As described above, the light intensity control unit 54 adjusts the luminance at the time of switching from the virtual image VI to the real image RI and adjusts the luminance at the time of switching from the real image RI to the virtual image VI, depending on the state of the environmental light outside and inside the vehicle. In the vehicle display device 1 according to the present embodiment, the driver DR can more comfortably visually recognize the virtual image VI and the real image RI by controlling the luminance change mode. To be specific, when the real image luminance adjustment unit 54a and the virtual image luminance adjustment unit 54b adjust the light intensity of the light source 11, each unit adjusts the light intensity of the light source 11 in such a way as to become the real image display luminance setting value and the virtual image display luminance setting value, while increasing the luminance over time from a transient luminance setting value, which is a luminance lower than the real image display luminance setting value and the virtual image display luminance setting value.

Figure 9A:
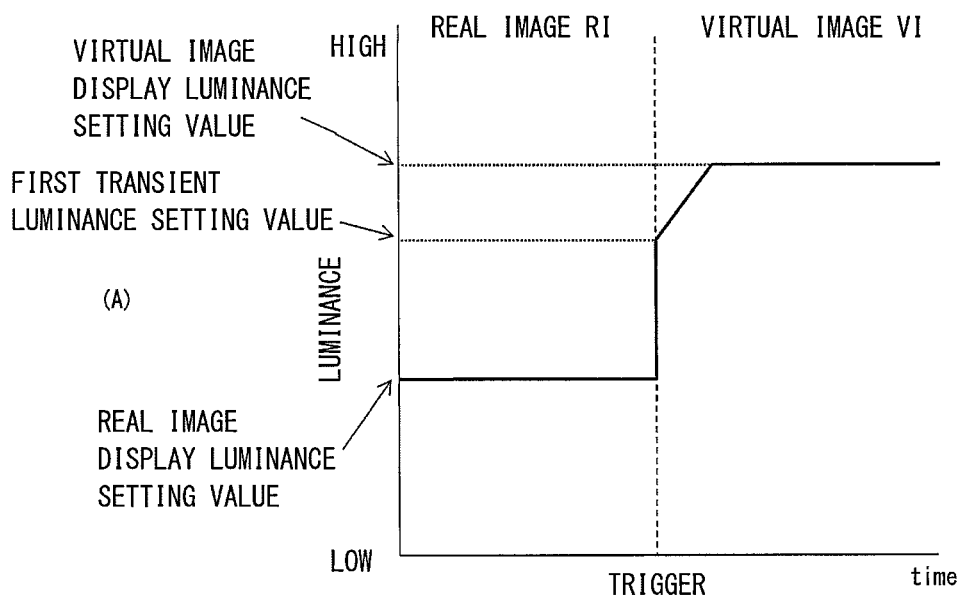
FIGS. 9A and 9B are diagrams each illustrating an example of a change mode of luminance in a case of switching between real image display and virtual image display in daytime or evening.
Figure 9B:
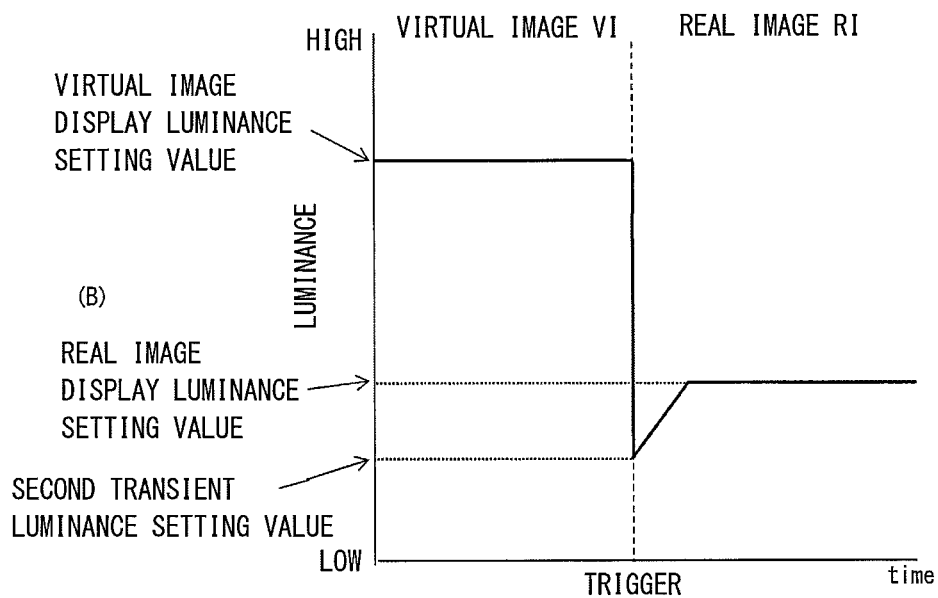

FIGS. 9A and 9B are diagrams each illustrating an example of a change mode of luminance in a case where the real image RI display and the virtual image VI display are switched in the daytime or in the evening. FIG. 9A is a diagram illustrating a change mode of luminance in a case of switching from the real image RI display to the virtual image VI display, and FIG. 9B is a diagram illustrating a change mode of luminance in a case of switching from the virtual image VI display to the real image RI display.

The case of FIG. 9A illustrates control of switching from a state where the real image RI having a relatively low luminance is displayed to a state where the virtual image VI is displayed at a luminance of a virtual image display luminance setting value set to be relatively high as illustrated in FIGS. 5 and 6. The virtual image luminance adjustment unit 54b adjusts the light intensity of the light source 11 in such a way as to become the virtual image display luminance setting value, while increasing the luminance over time from a first transient luminance setting value, which is a luminance lower than the virtual image display luminance setting value, after the trigger is received.

The case of FIG. 9B illustrates control of switching from a state where the virtual image VI having a relatively high luminance is displayed to a state where the real image RI is displayed at luminance of the real image display luminance setting value set to be relatively low as illustrated in FIGS. 5 and 6 is illustrated. The real image luminance adjustment unit 54a adjusts the light intensity of the light source 11 in such a way as to become the real image display luminance setting value, while increasing the luminance over time from a second transient luminance setting value, which is a luminance lower than the real image display luminance setting value, after the trigger is received.

Figure 10A:
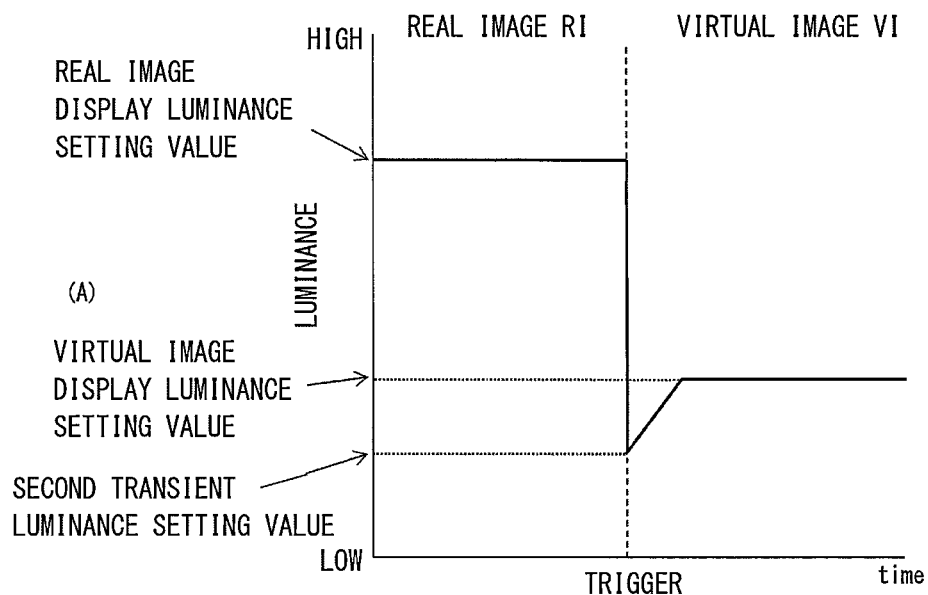
FIGS. 10A and 10B are diagrams each illustrating an example of a change mode of luminance in a case of switching between real image display and virtual image display at night.
Figure 10B:
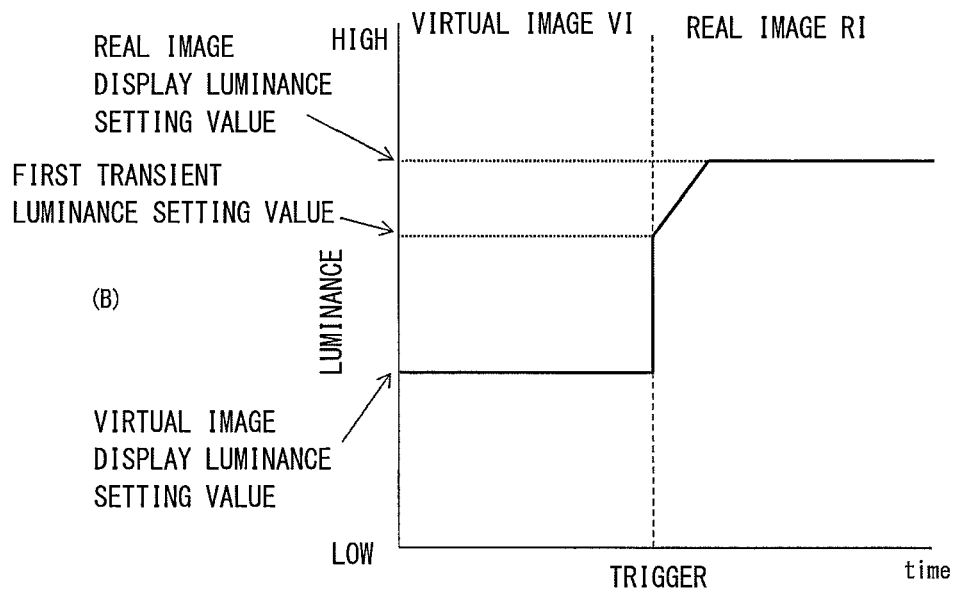

FIGS. 10A and 10B are diagrams each illustrating an example of a change mode of the luminance in a case where the real image RI display and the virtual image VI display are switched at night. FIG. 10A is a diagram illustrating a change mode of luminance in a case of switching from the real image RI display to the virtual image VI display, and FIG. 10B is a diagram illustrating a change mode of luminance in a case of switching from the virtual image VI display to the real image RI display.

The case of FIG. 10A illustrates control of switching from a state where the real image RI having a relatively high luminance is displayed to a state where the virtual image VI is displayed at luminance of the virtual image display luminance setting value set to be relatively low as illustrated in FIG. 7. The virtual image luminance adjustment unit 54b adjusts the light intensity of the light source 11 in such a way as to become the virtual image display luminance setting value, while increasing the luminance over time from a second transient luminance setting value, which is a luminance lower than the virtual image display luminance setting value, after the trigger is received.

The case of FIG. 10B illustrates control of switching from a state where the virtual image VI having a relatively low luminance is displayed to a state where the real image RI is displayed at the luminance of the real image display luminance setting value set to be relatively high as illustrated in FIG. 7. The real image luminance adjustment unit 54a adjusts the light intensity of the light source 11 in such a way as to become the real image display luminance setting value, while increasing the luminance over time from a first transient luminance setting value, which is a luminance lower than the real image display luminance setting value, after the trigger is received.

In FIGS. 9A and 10B, the first transient luminance setting value is set to a value between the real image display luminance setting value and the virtual image display luminance setting value, but the first transient luminance setting value may be a luminance value of the display light L before switching. In other words, the change mode of luminance may be as illustrated in FIG. 8A.

In addition, in the block diagram of FIG. 4, a configuration in which the display luminance setting information 52 is stored in the setting unit 3 (e.g., a storage unit such as a ROM provided in the vehicle C) outside the HUD device 2 has been described, but the setting unit 3 may be provided inside the HUD device 2.

Figure 11:
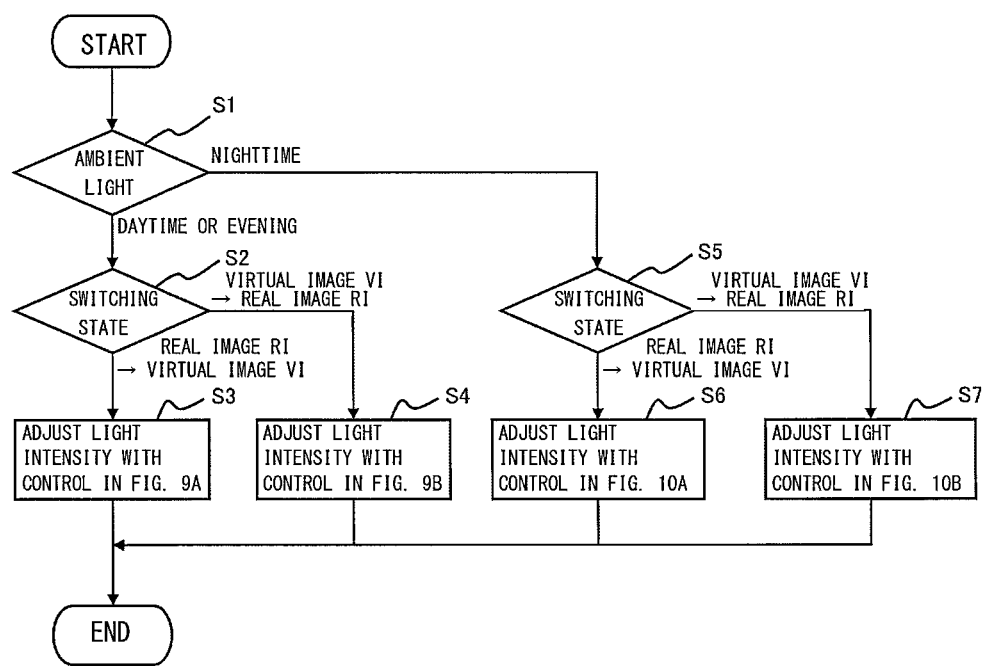
FIG. 11 is a flowchart illustrating an operation of a control unit in the vehicle display device according to the first embodiment of the present invention.

Next, an operation of the control unit 15 in a case of switching between the virtual image VI display and the real image RI display will be described. FIG. 11 is a flowchart illustrating the operation of the control unit 15 in the vehicle display device 1 according to the present embodiment. First, the control unit 15 acquires, as the external information for 53, example, information related to the on/off state of headlights, and determines whether the current time is in the daytime or evening, or in the nighttime (S1). The processing of the S1 is not limited to the information related to the state of the headlights, and as described above, the illuminance information of the external light detected by the illuminance sensor provided in the vehicle C may be used.

When it is determined that it is daytime or evening in S1, the control unit 15 determines whether the switching of the display light L is switching from the real image RI display to the virtual image VI display or switching from the virtual image VI display to the real image RI display (S2). In S2, when the display light L is switched from the real image RI display to the virtual image VI display, the virtual image luminance adjustment unit 54b of the light intensity control unit 54 adjusts the light intensity of the light source 11 in the change mode of the luminance value illustrated in FIG. 9A (S3) (light intensity control process), and the processing ends. In S2, when the display light L is switched from the virtual image VI display to the real image RI display, the real image luminance adjustment unit 54a of the light intensity control unit 54 adjusts the light intensity of the light source 11 in the change mode of the luminance value illustrated in FIG. 9B (S4) (light intensity control process), and the processing ends.

When it is determined to be nighttime in S1, it is determined whether the switching of the display light L is switching from the real image RI display to the virtual image VI display or switching from the virtual image VI display to the real image RI display (S5). In S5, when the display light L is switched from the real image RI display to the virtual image VI display, the virtual image luminance adjustment unit 54b of the light intensity control unit 54 adjusts the light intensity of the light source 11 in the change mode of the luminance value illustrated in FIG. 10A (S6) (light intensity control process), and the processing ends. In S5, when the display light L is switched from the virtual image VI display to the real image RI display, the real image luminance adjustment unit 54a of the light intensity control unit 54 adjusts the light intensity of the light source 11 in the change mode of the luminance value illustrated in FIG. 10B (S7) (light intensity control process), and the processing ends.

In this way, the vehicle display device 1 according to the present embodiment, which is provided in the vehicle C including the seat on which the driver DR sits and the windshield WS and emits display light L from the opening 17 toward the windshield WS and thereby allows the virtual image VI and the real image RI of the display image represented by the display light L to be visually recognized, includes the display unit 12 that includes the display element 121, the display unit 12 transmitting light emitted from the light source 11 and displaying the display image, the reflection unit 13 that reflects light representing the display image displayed on the display unit 12 toward the windshield WS, and the control unit 15. The control unit 15 executes light intensity control processing (S3, S4, S6, and S7 in FIG. 11) of controlling the light intensity of the light source 11 in such a way that the real image display luminance setting value when the real image RI is visually recognized and the virtual image display luminance setting value when the virtual image VI is visually recognized have a predetermined luminance difference from each other. Therefore, it is possible to provide an appropriate luminance difference between the luminance of the real image RI that is normally displayed on the vehicle interior side and the luminance of the virtual image VI that is normally displayed on the vehicle exterior side. This makes it possible to avoid visual discomfort and dazzle which may occur in a case of switching between the real image RI display and the virtual image VI display at the same luminance.

In addition, in the vehicle display device 1 according to the present embodiment, as necessary, the control unit 15 controls, in the light intensity control processing, the light intensity of the light source 11 in such a way that the virtual image display luminance setting (luminance of the virtual image VI display based on the virtual image display luminance setting value) is brighter than the real image display luminance setting (luminance of the real image RI display based on the real image display luminance setting value), and therefore, the outside of the vehicle is in a state equal to or brighter than the inside of the vehicle in the daytime or evening, for example. In this case, if the real image RI and the virtual image VI have the same luminance, the driver DR feels that the real image RI is dazzling, and thus, it is possible to prevent the above-described dazzle or discomfort by controlling the real image RI to be darker (in other words, the virtual image VI to be brighter).

Furthermore, in the vehicle display device 1 according to the present embodiment, as necessary, the control unit 15 controls, in the light intensity control processing, the light intensity of the light source 11 in such a way that the real image display luminance setting (luminance of the real image RI display based on the real image display luminance setting value) is brighter than the virtual image display luminance setting (luminance of the virtual image VI display based on the virtual image display luminance setting value), and therefore, the inside of the vehicle (when the vehicle interior light is on) is in a state equal to or brighter than the outside of the vehicle at night, for example. In this case, if the real image RI and the virtual image VI have the same luminance, the driver DR feels that the virtual image VI is dazzling, and thus, it is possible to prevent the above-described dazzle or discomfort by controlling the virtual image VI to be darker (in other words, the real image RI to be brighter).

Furthermore, in the vehicle display device 1 according to the present embodiment, as necessary, in a case where the headlights provided in the vehicle C are turned off or in a case where the illuminance of the external light detected by the illuminance sensor provided in the vehicle C is equal to or greater than a predetermined value, the control unit 15 performs the light intensity control processing of controlling the light intensity of the light source 11 in such a way that the virtual image display luminance setting (the luminance of the virtual image VI display based on the virtual image display luminance setting value) is brighter than the real image display luminance setting (the luminance of the real image RI display based on the real image display luminance setting value), and therefore, by setting headlights to be turned off and a predetermined value or more of the detected illuminance as a trigger, daytime or evening can be accurately detected and the light intensity control processing can be precisely and reliably performed.

Furthermore, in the vehicle display device 1 according to the present embodiment, as necessary, in a case where the headlights provided in the vehicle C are turned on or in a case where the illuminance of the external light detected by the illuminance sensor provided in the vehicle C is greater than a predetermined value, the control unit 15 executes the light intensity control processing of controlling the light intensity of the light source 11 in such a way that the real image display luminance setting (the luminance of the real image RI display based on the real image display luminance setting value) is brighter than the virtual image display luminance setting (the luminance of the virtual image VI display based on the virtual image display luminance setting value), and therefore, by setting headlights to be turned on and the detected illuminance that is less than a predetermined value as a trigger, nighttime can be accurately detected and the light intensity control processing can be precisely and reliably performed.

Furthermore, the vehicle display device 1 according to the present embodiment, as necessary, when switching from the relatively dark luminance setting on one side to the relatively bright luminance setting on an other side among the real image display luminance setting (luminance of the real image RI display based on the real image display luminance setting value) and the virtual image display luminance setting (luminance of the virtual image VI display based on the virtual image display luminance setting value) in the light intensity control processing, the control unit 15 controls the light intensity of the light source 11 in such a way that after reaching a first transient luminance setting value that is darker than the luminance setting of the other side, from the luminance setting on the one side, the luminance increases over time from the first transient luminance setting value and becomes the luminance setting of the other side. Therefore, when switching from the dark luminance setting to the bright luminance setting, rather than suddenly switching to a bright luminance, the luminance is transiently switched to a slightly darker luminance than the above-mentioned bright luminance setting, and then the luminance is gradually increased to shift to the above-mentioned bright luminance setting, and thus it is possible to alleviate the discomfort felt by the driver DR due to luminance switching and reduce increased strain on the eyes.

Furthermore, in the vehicle display device 1 according to the present embodiment, as necessary, the control unit 15 controls the light intensity of the light source 11 in such a way that when switching to a relatively dark luminance setting on one side from a relatively bright luminance setting on an other side among the real image display luminance setting (luminance of the real image RI display based on the real image display luminance setting value) and the virtual image display luminance setting (luminance of the virtual image VI display based on the virtual image display luminance setting value) in the light intensity control processing, after reaching a second transient luminance setting value that is darker than the luminance setting on the one side, from the luminance setting on the other side, the luminance increases over time from the second transient luminance setting value and becomes the luminance setting on one side. Therefore, when switching from the bright luminance setting to the dark luminance setting, rather than suddenly switching to a dark luminance, the luminance is transiently switched to a slightly darker luminance than the above-mentioned dark luminance setting, and then the luminance is gradually increased to shift to the above-mentioned dark luminance setting, and thus it is possible to alleviate the discomfort felt by the driver DR due to luminance switching and reduce increased strain on the eyes.

Furthermore, in the vehicle display device 1 according to the present embodiment, as necessary, the reflection unit 13 includes the first mirror 131 that reflects the display light L1 and transmits the display light L2 and the second mirror 132 that reflects the display light L2, and the first mirror 131 and the second mirror 132 can smoothly switch between the real image RI display and the virtual image VI display because when the display element 121 emits the display light L1, a positional relationship between an optical focal point F of an imaging optical system including the windshield WS and the reflection unit 13 and the display unit 12 is in a first state where the display unit 12 is closer to the opening 17 than the optical focal point F, and therefore, the virtual image VI can be visually recognized, and when the display element 121 emits the display light L2, the positional relationship is in a second state where the display unit 12 is closer to the light source 11 the optical focal point F, and therefore, the real image RI can be visually recognized.

Second Embodiment

A vehicle display device 1 according to the present embodiment will be described with reference to FIG. 12. A vehicle display device 1 according to the present embodiment has a configuration in which an HUD device 2 includes two picture generation units (PGUs). In the present embodiment, a description that overlaps with those of the first embodiment will be omitted.

FIG. 12 is a diagram illustrating a configuration of the vehicle display device 1 according to the present embodiment. In FIG. 12, the HUD device 2 of the vehicle display device 1 includes a first PGU 10a having a first light source 11a that emits light in a visible wavelength range and a first display unit 12a that transmits light emitted from the first light source 11a and that displays a real image RI of a display image formed in front of a driver DR, a second PGU 10b including, for example, at least a second light source 11b that emits light in a visible wavelength range and a second display unit 12b that transmits light emitted from the second light source 11b and that displays a virtual image VI of a display image formed in front of the driver DR, a reflection unit 13 that reflects a first display light L11 representing a display image displayed in the first display unit 12a and a second display light L22 representing a display image displayed in the second display unit 12b toward a windshield WS (translucent member), and a control unit 15 that performs control of display contents in the first display unit 12a and the second display unit 12b, control of switching between the first PGU 10a and the second PGU 10b, and control of luminance by adjusting a light intensity of light emitted from the first light source 11a and the second light source 11b, and these are accommodated in a housing 16.

The control unit 15 may be configured to control the first PGU 10a and the second PGU 10b by one control unit 15 as illustrated in FIG. 12, or may be configured such that the first PGU 10a and the second PGU 10b each have a unique control unit and the control unit 15 controls the unique control units in cooperation with each other.

In the first PGU 10a illustrated in FIG. 12, the first light source 11a is, for example, a light-emitting diode that is mounted on an interconnection substrate and that emits light in a visible wavelength range, and emits white light. The first display unit 12a is provided closer to the opening 17 along an optical path than the first light source 11a, and includes TFT type first display elements illustrated) that form first display light L11 representing an arbitrary image in accordance with a control signal sent from the control unit 15.

In the second PGU 10b illustrated in FIG. 12, the second light source 11b is, for example, a light-emitting diode that is mounted on an interconnection substrate and that emits light in a visible wavelength range, and emits white light.

The second display unit 12b is provided closer to the opening 17 along an optical path than the second light source 11b, and includes TFT type second display elements (not illustrated) that form the second display light L22 representing an arbitrary image in accordance with a control signal sent from the control unit 15.

In the first PGU 10a and the second PGU 10b, in addition to the above, optical members such as a condenser lens, a lenticular lens, a diffusion plate, and a polarization plate may be disposed at arbitrary positions on the rear stage side of each of the first light source 11a and the second light source 11b.

In FIG. 12, the reflection unit 13 includes a first correction mirror 1310, a second correction mirror 1320, and a concave mirror 1330, the first correction mirror 1310 reflecting the first display light L11 emitted from the first display unit 12a toward the second correction mirror 1320, the second correction mirror 1320 reflecting the first display light L11 emitted from the first correction mirror 1310 toward the concave mirror 1330, and the concave mirror 1330 reflecting the first display light L11 reflected and returned by the first correction mirror 1310 and the second correction mirror 1320 and the second display light L22 transmitted through the second correction mirror 1320 toward the opening 17.

Each of the first correction mirror 1310 and the second correction mirror 1320 has a mirror surface, and has a complicated free-form surface shape in order to correct distortion of an image visually recognized by the driver DR. The second correction mirror 1320 is, for example, a half mirror, and transmits the second display light L22 representing the virtual image VI displayed on the second display unit 12b. The second display light L22 transmitted through the second correction mirror 1320 is directly incident on the concave mirror 1330. The concave mirror 1330 is rotatably installed, rotates in accordance with a position of the eyes of the driver DR, freely changes directions of emitting the first display light L11 and the second display light L22, and adjusts a position of the image. In particular, it may be desirable that the angle of the display surface be different between when the first display light L11 displays the real image RI and when the second display light L22 displays the virtual image VI (for example, the virtual image VI is displayed in such a way as to be inclined with respect to a road surface, and the real image RI is displayed in such a way as to stand perpendicular to the road surface). By performing adjustments using such rotational driving, it becomes possible to display the display image at an angle suitable for each of the real image RI and the virtual image VI.

The first correction mirror 1310 is disposed closer to the opening 17 than the first PGU 10a along an optical path of the first display light L11, and is disposed closer to the first PGU 10a than a first optical focal point F1 of an imaging optical system including the windshield WS, the second correction mirror 1320, and the concave mirror 1330. In addition, the second display unit 12b of the second PGU 10b is disposed closer to the opening 17 than a position of a second optical focal point F2 of an imaging optical system including the windshield WS and the concave mirror 1330 along an optical path of the second display light L22.

With such a configuration, when the first light source 11a is turned on, the first display light L11 emitted from the first PGU 10a is reflected by the first correction mirror 1310, the second correction mirror 1320, the concave mirror 1330, and the windshield WS, and the driver DR can visually recognize the real image RI on the inside of the vehicle with the windshield WS interposed therebetween. In addition, when the second light source 11b is turned on, the second display light L22 emitted from the second PGU 10b passes through the second correction mirror 1320 and is reflected by the concave mirror 1330 and the windshield WS, thereby allowing the driver DR to visually recognize the virtual image VI on the outside of the vehicle with the windshield WS interposed therebetween.

The control unit 15 controls the first PGU 10a and the second PGU 10b in cooperation with each other, turns on/off the first light source 11a, turns on/off the second light source 11b, performs control of the display contents on the first display unit 12a, control of the display contents on the second display unit 12b, and control of the luminance of the first display light L11 emitted by the first display unit 12a and the second display light L22 emitted by the second display unit 12b by adjusting the light intensities of the light emitted by the first light source 11a and the second light source 11b.

In the present embodiment, the control unit 15 performs control such that the same behavior as the setting and change mode of the luminance of the real image RI and the setting and change mode of the luminance of the virtual image VI, which are described in the first embodiment is acquired. Namely, according to the flowchart of FIG. 11, in each of the scenes illustrated in FIGS. 5 to 7, the control of the luminance value as illustrated in FIGS. 8A and 8B is performed, and the luminance of the real image RI and the luminance of the virtual image VI are adjusted in the same change mode as in FIGS. 9A and 9B and FIGS. 10A and 10B.

In the first embodiment, the real image luminance adjustment unit 54a controls the luminance of the display light L2 for the real image RI, which becomes a second polarized light, by adjusting the light intensity of the light source 11, and the virtual image luminance adjustment unit 54b controls the luminance of the display light L1 for the virtual image VI, which becomes a first polarized light, by adjusting the light intensity of the light source 11. In the present embodiment, the real image luminance adjustment unit 54a controls the luminance of the first display light L11 by adjusting the light intensity of the first light source 11a that is a light source for the real image RI, and the virtual image luminance adjustment unit 54b controls the luminance of the second display light L22 by adjusting the light intensity of the second light source 11b that is a light source for the virtual image VI.

Further, in a case of the configuration of the vehicle display device 1 illustrated in FIG. 12, it is possible to simultaneously display the real image RI and the virtual image VI by turning on both the first light source 11a and the second light source 11b. In the case of the simultaneous display, the control unit 15 controls the luminance of the real image RI and the luminance of the virtual image VI in response to the display luminance setting information 52 (real image display luminance setting value and virtual image display luminance setting value) for each scene illustrated in FIGS. 5 to 7. In short, in the cases of the daytime in FIG. 5 and the evening in FIG. 6, the luminance of the virtual image VI displayed outside the vehicle is controlled to be relatively higher than the luminance of the real image RI displayed inside the vehicle, and in the case of the nighttime in FIG. 7, the luminance of the real image RI displayed inside the vehicle is controlled to be relatively higher than the luminance of the virtual image VI displayed outside the vehicle.

Further, in a state where the real image RI and the virtual image VI are simultaneously displayed, when environmental light outside or inside the vehicle transitions from a bright state to a dark state or from a dark state to a bright state (for example, when entering a tunnel or exiting from a tunnel in the daytime), the control unit 15 controls the luminance of each display image according to the transition of each scene. Specifically, for example, in a case of transition from a bright state in the daytime (for example, corresponding to the case of FIG. 5 or FIG. 6) to a dark state in a tunnel (for example, corresponding to the case of FIG. 7), control is performed in such a way as to change from a display state where the luminance of the real image RI is low and the luminance of the virtual image VI is high to a display state where the luminance of the real image RI is high and the luminance of the virtual image VI is low. Further, in a case of transition from a dark state in the tunnel (for example, corresponding to the state of FIG. 7) to a bright state in the daytime after exiting the tunnel (for example, corresponding to FIG. 5 or FIG. 6), control is performed in such a way as to change from a display state where the luminance of the real image RI is high and the luminance of the virtual image VI is low to a display state where the luminance of the real image RI is low and the luminance of the virtual image VI is high.

As described above, in the vehicle display device 1 according to the present embodiment, even in the configuration in which two of the first PGU 10a and the second PGU 10b are provided, visual discomfort or dazzle caused to the driver DR can be avoided, similarly to the case of the first embodiment. In addition, it is possible to simultaneously display the virtual image VI and the real image RI, and even in this case, visual discomfort or dazzle caused to the driver DR can be avoided by adjusting the luminance of each image.

REFERENCE SIGNS LIST

C Vehicle
DR Driver
F Optical focal point
F1 First optical focal point
F2 Second optical focal point
L (L1, L2) Display light
L11 First display light
L22 Second display light
VI Virtual image
RI Real image
R1, R2 Curvature radius
WS Windshield
1 Vehicle display device
2 HUD device
3 Setting unit
11 Light source
11a First light source
11b Second light source
12 Display unit
12a First display unit
12b Second display unit
13 Reflection unit
15 Control unit
16 Housing
17 Opening
18 Cover glass
20 Switch
21 Display control unit
22 Display unit drive unit
30 Various devices
51 Operation unit
52 Display luminance setting information 53 External information
54 Light intensity control unit
54a Real image luminance adjustment unit
54b Virtual image luminance adjustment unit
55 Switching control unit
56 Display control unit
121 Display element
122 Switching element
131 First mirror
132 Second mirror
133 Third mirror
1310 First correction mirror
1320 Second correction mirror
1330 Concave mirror

The invention claimed is:

1. A vehicle display device that is provided in a vehicle including a seat on which an occupant sits and a translucent member and that emits display light from an emission port toward the translucent member and thereby allows a virtual image and a real image of a display image represented by the display light to be visually recognized, the vehicle display device comprising:
   a display unit that includes a display element, the display unit transmitting light emitted by a light source and displaying the display image;
   a reflection unit that reflects light representing the display image displayed on the display unit toward the translucent member; and
   a control unit, wherein
   the control unit executes light intensity control processing of controlling a light intensity of the light source in such a way that a first display luminance setting when the real image is visually recognized and a second display luminance setting when the virtual image is visually recognized have a predetermined luminance difference from each other.

2. The vehicle display device according to claim 1, wherein the control unit controls, in the light intensity control processing, the light intensity of the light source in such a way that the second display luminance setting is brighter than the first display luminance setting.

3. The vehicle display device according to claim 1, wherein the control unit controls, in the light intensity control processing, the light intensity of the light source in such a way that the first display luminance setting is brighter than the second display luminance setting.

4. The vehicle display device according to claim 2, wherein, in a case where headlights provided in the vehicle are turned off, or in a case where an illuminance of external light detected by an illuminance sensor provided in the vehicle is less than a predetermined value, the control unit executes the light intensity control processing of controlling the light intensity of the light source in such a way that the second display luminance setting is brighter than the first display luminance setting.

5. The vehicle display device according to claim 3, wherein, in a case where headlights provided in the vehicle are turned on, or in a case where an illuminance of external light detected by an illuminance sensor provided in the vehicle is a predetermined value or more, the control unit executes the light intensity control processing of controlling the light intensity of the light source in such a way that the first display luminance setting is brighter than the second display luminance setting.

6. The vehicle display device according to claim 1, wherein, when switching from a relatively dark luminance setting on one side to a relatively bright luminance setting on an other side among the first display luminance setting and the second display luminance setting in the light intensity control processing, the control unit controls the light intensity of the light source in such a way that, after transitioning from the luminance setting on the one side to a first transient luminance setting that is darker than the luminance setting on the other side, the luminance increases over time from the first transient luminance setting to result in the luminance setting on the other side.

7. The vehicle display device according to claim 1, wherein, when switching to a relatively dark luminance setting on one side from a relatively bright luminance setting on an other side among the first display luminance setting and the second display luminance setting in the light intensity control processing, the control unit controls the light intensity of the light source in such a way that, after transitioning from the luminance setting on the other side to a second transient luminance setting that is darker than the luminance setting on the one side, the luminance increases over time from the second transient luminance setting to result in the luminance setting on the one side.

8. The vehicle display device according to claim 1, wherein
   the reflection unit includes a first mirror that reflects a first light beam and that transmits a second light beam and a second mirror that reflects the second light beam, and
   the first mirror and the second mirror are disposed in such a way that:
   when the display element emits the first light beam, a positional relationship between an optical focal point of an imaging optical system including the translucent member and the reflection unit and the display unit is in a first state where the display unit is closer to the emission port than the optical focal point, and the virtual image is visually recognized; and
   when the display element emits the second light beam, the positional relationship is in a second state where the display unit is closer to the light source than the optical focal point, and the real image is visually recognized.

* * * * *